United States Patent Office 2,783,557
Patented Mar. 5, 1957

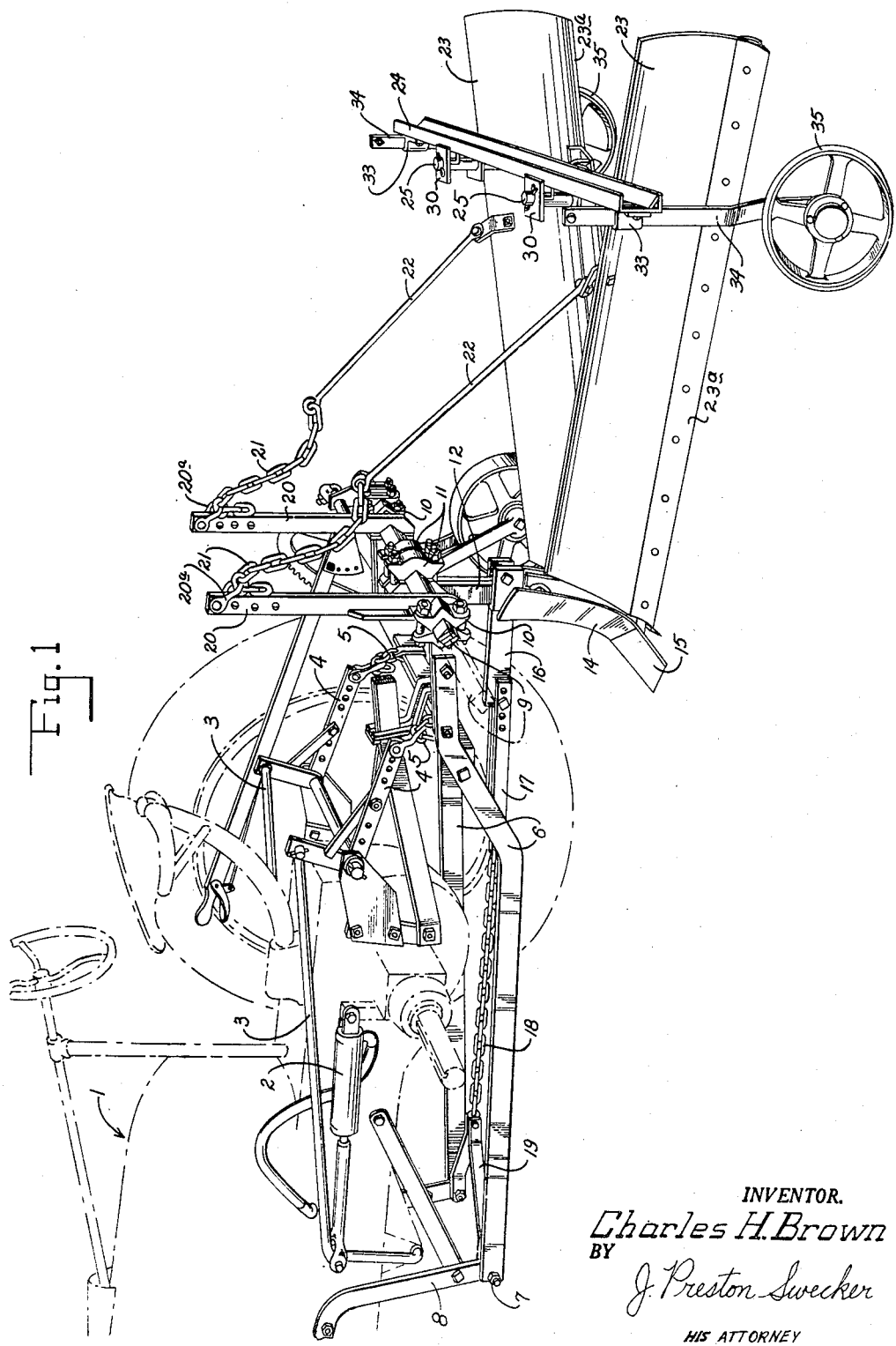

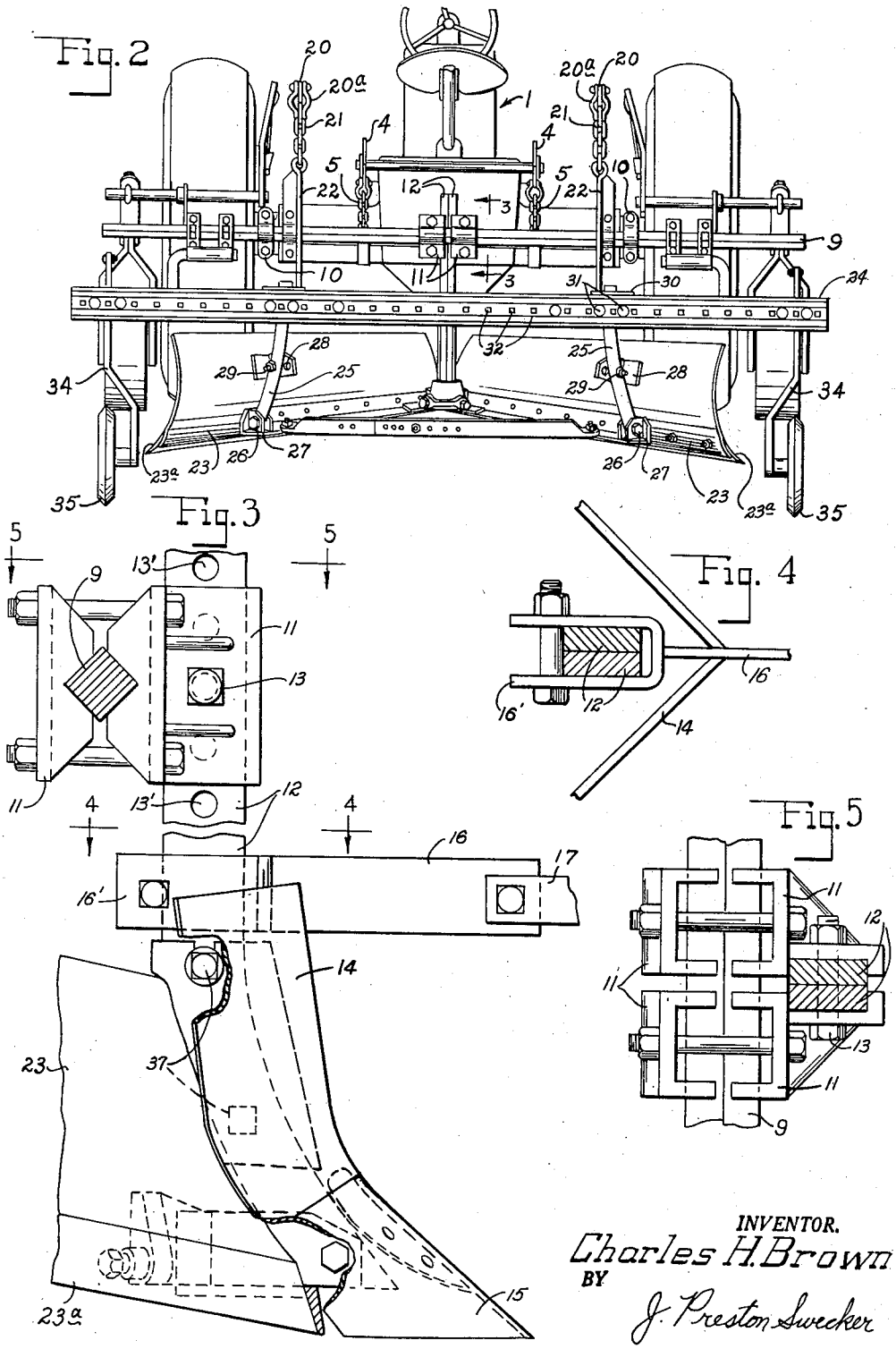

2,783,557

DITCH FORMING IMPLEMENT

Charles H. Brown, Fort Worth, Tex.; Gladys Brown Carnes, executrix of said Charles H. Brown, deceased, assignor of one-half to Josie M. Brown, one-tenth to Ruth Brown McCluney, one-tenth to Mildred Brown Turns, one-tenth to Gladys Brown Carnes, one-tenth to Charles H. Brown, Jr., and one-tenth to Vivian Brown Hamilton, Fort Worth, Tex.

Original application May 19, 1948, Serial No. 27,919, now Patent No. 2,641,071, dated June 9, 1953. Divided and this application March 11, 1952, Serial No. 275,961

3 Claims. (Cl. 37—98)

This application is a division of my application Serial No. 27,919, filed May 19, 1948, now Patent No. 2,641,071, granted June 9, 1953.

This invention relates to improvements in Ditch Forming Implements, and more particularly to implements that may be operated behind a draft device, such as a tractor.

Various types of ditchers have been proposed heretofore, but in general these have been defective in certain respects sufficient to render them either too large, clumsy, and cumbersome for effective work, or if sufficiently small to be used in close places and with small tractors, the construction was too light to withstand the load put upon it.

An object of this invention is to improve the construction and operation of a ditcher implement, whereby the draft or line of pull is applied at a point below the axis of the draft device and intermediate the tool supporting bar thereof and the moldboard plow that initially opens the furrow for the ditching operation, so as to prevent chattering in hard dry soil.

In the present device, an effort has been made to make a ditcher of minimum weight, so constructed as to give a maximum strength, thereby making possible the use of a comparatively light machine to do heavy work, which would normally require a larger tractor. The present ditcher has great versatility, is readily adjustable and makes possible the forming of small or large, substantially V-shaped, ditches that are flat in the bottom.

An embodiment of this invention is illustrated in the accompanying drawings, in which:

Fig. 1 is a perspective view of the device with parts broken away and in section to bring out the details of construction, and shown attached to a tractor, which tractor is shown in dot-dash lines;

Fig. 2 is a rear elevation of the implement shown attached to a tractor;

Fig. 3 is an enlarged fragmentary side elevation, with parts broken away and in section, and showing the moldboard ditch opening plow and the draft connection with the plow beam;

Fig. 4 is a cross section on the line 4—4 in Fig. 3;

Fig. 5 is a similar view taken on the line 5—5 in Fig. 3;

With more detailed reference to the drawings, the numeral 1 designates a conventional tractor having hydraulic power lift devices 2, each including a cylinder with a piston operating therein by hydraulic pressure. The power lift devices 2 are mounted on opposite sides of the tractor and are adapted to raise and lower implement connecting devices through the action of link bars 3 connected at one end with the power lift devices 2 and at the opposite end with bell cranks 4, which in turn are connected by chains 5 with links or compression bars 6.

The links 6 are pivotally supported at their forward ends on bolts 7 mounted on support brackets 8 secured to the tractor 1, while the rear ends thereof support an implement tool bar 9, by means of clamps 10. Clamps 11 are secured to the tool bar 9 intermediate the clamps 10 and approximately on the longitudinal medial line of the tractor. The clamps 11, which are shown more in detail in Figs. 3 and 5, also embrace vertical plow beams 12. The plow beams are adjustable vertically with respect to the clamps 11, and are secured in vertically adjusted positions by a bolt 13 connected with the clamps 11 and inserted selectively in holes 13' in the plow beams 12.

It is preferable to have a pair of plow beams 12 mounted in side-by-side relation and extending downwardly from the tool bar 9 and having a moldboard ditch opening plow 14 secured on the lower end thereof by bolts 37. The plow 14 may be provided with a removable point 15.

Intermediate the sides of the plow 14 at the top thereof, a draft connection 16 is provided which is secured by a yoke 16' to the plow beams 12. The draft connection 16 has a link member 17 adjustably connected at one end to the front end thereof, which member 17 in turn is connected with a flexible element, such as a chain 18. The forward end of the chain 18 is connected with a bifurcated bar 19 that is connected to the bolts 7 attached to the bracket 8.

Mounted on opposite sides of the clamps 11 are upright levers 20 which are clamped to the tool bar 9, as shown in Fig. 1. These levers 20 are connected with one end of flexible elements 21, which elements may be adjusted with respect to the levers 20. Clevises 20a are provided and adjustably connected with the upper ends of the levers 20, so as to provide adjustment for the chains 21 with the levers to the various operating and transport positions.

The other ends of the flexible elements 21 are connected to links 22 which extend rearwardly and connect at the top with a pair of diverging moldboard blades 23. These moldboard blades 23 widen and form the ditch opened by the ditch opening plow 14.

The angularly diverging moldboard blades 23 have removable cutting elements 23a on the lower edges thereof, which cutting elements are formed of metal and have a comparatively short radius, which radius is tangential to the longer radius of the blades 23, as shown in Fig. 2. The cutter blade 23a is double edged and reversible.

The moldboard blades 23 are held in spaced angularly diverging relation by a transverse bar 24 which interconnects the blades 23 by upright standards 25. The lower end of each of the standards 25 has a pivot bolt 26 (Fig. 2) extending therethrough and through lugs 27 mounted near the lower edge of each moldboard blade 23. Spaced upward therefrom and secured to the rear face of the blade 23 is a lug 28 offstanding therefrom, as shown in Fig. 2, and having spaced holes therein for selectively receiving a bolt 29 for adjustment of the moldboard blade 23 with respect to the vertical.

The upper ends of the standards 25 are mounted in clamps 30 which are secured to the transverse bar 24 by bolts 31. A series of holes 32 are provided spaced lengthwise of the transverse bar 24 for selectively receiving the bolts 31, so the clamps 30 may be adjusted at any desired point to give the correct angular divergence to the moldboard blades 23. Also secured to the transverse bar 24, near the outer ends thereof, are clamps 33, which are adapted to bindingly engage wheel support standards 34 connected with wheels 35, to make possible the correct vertical adjustment of the wheels 35, and to provide proper guiding relation of the wheels relative to the implement.

In the operation of the ditcher, the plow beams 12 are adjusted vertically in clamps 11 so that the plow 14 is set to give the proper depth to the ditch when the tool bar 9, links 6, and draft connection 16 are in their lowered positions. The draft connection 16 transmits the draft of the tractor 1 directly to plow beams 12 at a point near the top of the plow 14, which relieves the tool bar 9 of all torsional strain. This characteristic has not been present in connections of this type heretofore.

By having the draft applied to the plow beams 12 at a point below the axis of the tractor wheels, a much more stable pull is accorded and a much greater load can be pulled by the tractor with greater stability than has been possible heretofore. Because the line of pull is connected directly to the plow beam, substantially at the top of the ground, and below the axis of the tractor wheels, the tractor can pull a heavier load without chattering. The tendency to rear up is greatly diminished because the line of draft has been lowered considerably. Furthermore, due to the plow being of the suction type, the tendency is for the plow to be drawn into the ground; thus the tractor wheels are drawn downward into tighter engagement with the ground, thereby affording greater traction. After opening the first furrow, in digging deep ditches, the line of draft from the pivot bolt 7 to the plow 14, passes below the ground contact line of the rear tractor wheels. Thus a tendency of the tractor to rear up and turn over backward is entirely overcome if a ledge or stone or other subsurface obstacle should be struck by the plow.

Since the links 6 and draft members 16—19 are connected with the tractor at common pivot points 7, the entire ditcher unit, connected to implement tool bar 9, may be raised out of the ground by action of the hydraulic power lift, which comprises the parts 2—5, and since the pivot points 7 are common to both the links 6 and the members 16—19, as described above, the chain 18 will remain at substantially the same tightness, so that equal adjustment tension is transmitted to the links 6 and draft members 16—19, regardless of the depth of the plow 14 in the ground.

It is necessary to have the chains 21, that are attached to upright levers 20, slack when the machine is operating in normal ditching position. This allows the lifting of the plow 14 substantially clear of the ground before the chains 21 become sufficiently tight to lift the moldboard blades 23 out of the ditch. This two-stage action also alleviates the disposition of the tractor to rear upward.

It will be appreciated that the draft members 16—19 apply the draft pull to the plow beams 12 in such manner as to pull the plow beams forward. The tool bar 9 sustains the upper end of the plow beams against forward movement. The forward push of the upper end of the plow beams is transmitted in compression to the bars 6, which were normally draw bars. By having the pull located in this manner the chattering and vibration that usually is inherent in such connections in which the plow beams extend a substantial distance below the tool bar is eliminated. The functions left for the tool bar 9 are to maintain the top of the plow beams in aligned positions with the line of travel, and properly vertical by means of the clamps 11, and to prevent any tendency for chattering of the plow by preventing torsional movement around the point represented by the clamps 16 fastened approximately midway of the plow beams.

It is to be appreciated that in machines of this general character, as constructed heretofore, the draw bar would have sustained the pull of the load and would have been in tension.

In the present arrangement, the draft from the tractor is applied through draft members 16—19, to the plow beams 12 at a point near the top of the ground, when the plow is engaged in ditching operations. The upper ends of the plow beams 12 are restrained against forward movement by the tool bar 9. The tool bar, in turn, is held against forward movement by compression bar members 6 which are inter-connected with the tractor by the bolts 7 at points common to the connection of the draft members 16—19. By transmitting the pull to the plow beams at a point near the top of the ground, and restraining the top of the plow beams against forward movement, the pull on the plow is such as to give a non-chattering movement.

The members used on implements heretofore that were comparable to the members 6 of the present implement, were used as tension members when clamped to the tool bar, with a plow beam clamped at approximately right angles thereto and protruding eighteen or more inches therefrom. With a plow attached thereto, it can be appreciated readily that, when the plow was engaged in the ground, a vibratory or chattering action was accorded thereto, as the bar 9 was a torsion member. However, with the present construction, the tool bar 9 and clamps 11 are relieved of rearward bending and twisting strain, except that necessary to lift the ditcher moldbords and their appurtenances, when they are removed from the ground.

It is to be understood that, while the implement has been illustrated and described in one embodiment thereof, alterations and changes may be made in the construction without departing from the appended claims.

I claim:

1. In a ditch forming implement, the combination with a wheeled motor vehicle, of an earth opening plow of the suction type, a plow beam rigidly connected to said plow and extending upwardly therefrom, a horizontally extending tool bar rigidly secured to the upper end of said plow beam, a compression bar pivotally connected at one end on said motor vehicle and rigidly connected at its other end to said tool bar, said plow beam and said compression bar being connected to said tool bar at substantially the same horizontal level, power means on said vehicle for lifting said compression bar when desired to change the elevation of said plow, and draft means connected to said vehicle and directly to said plow beam at a point below said tool bar so that the pulling force necessary to move said suction plow in the forming of a ditch is applied by said draft means and the tool bar is not loaded in torsion, whereby chattering of the plow during the ditch forming operation is prevented.

2. In a ditch forming implement, the combination with a wheeled motor vehicle, of an earth opening plow of the suction type, a plow beam rigidly connected to said plow and extending upwardly therefrom, a horizontally extending tool bar rigidly secured to the upper end of said plow beam, a compression bar pivotally connected at one end on said motor vehicle and rigidly connected at its other end to said tool bar, said plow beam and said compression bar being connected to said tool bar at substantially the same horizontal level, power means on said vehicle for lifting said compression bar when desired to change the elevation of said plow, and draft means pivotally connected to said vehicle for movement about the pivotal axis of said compression bar and directly connected to said plow beam at a point below said tool bar so that the pulling force necessary to move said suction plow in the forming of a ditch is applied by said draft means and the tool bar is not loaded in torsion, whereby chattering of the plow during the ditch forming operation is prevented.

3. In a ditch forming implement, the combination with a wheeled motor vehicle, of an earth opening plow of the suction type, a plow beam rigidly connected to said plow and extending upwardly therefrom, a horizontally extending tool bar rigidly secured to the upper end of said plow beam, a compression bar pivotally connected at one end on said motor vehicle and rigidly connected at its other end to said tool bar, said plow beam and said compression bar being connected to said tool bar at substantially the same horizontal level, and draft means connected to said vehicle and directly to said plow beam at a point below said tool bar so that the pulling force necessary to move said suction plow in the forming of a ditch is applied by said draft means and the tool bar is not loaded in torsion, whereby chattering of the plow during the ditch forming operation is prevented.

References Cited in the file of this patent

UNITED STATES PATENTS

| | | |
|---|---|---|
| 935,288 | Witter | Sept. 28, 1909 |
| 1,836,625 | Sporri | Dec. 15, 1931 |
| 2,029,652 | Capps | Feb. 4, 1936 |
| 2,222,115 | Mott | Nov. 19, 1940 |
| 2,311,551 | Laird | Feb. 16, 1943 |
| 2,357,999 | Cheek | Sept. 12, 1944 |
| 2,648,919 | Brown | Aug. 18, 1953 |